Patented Apr. 22, 1952

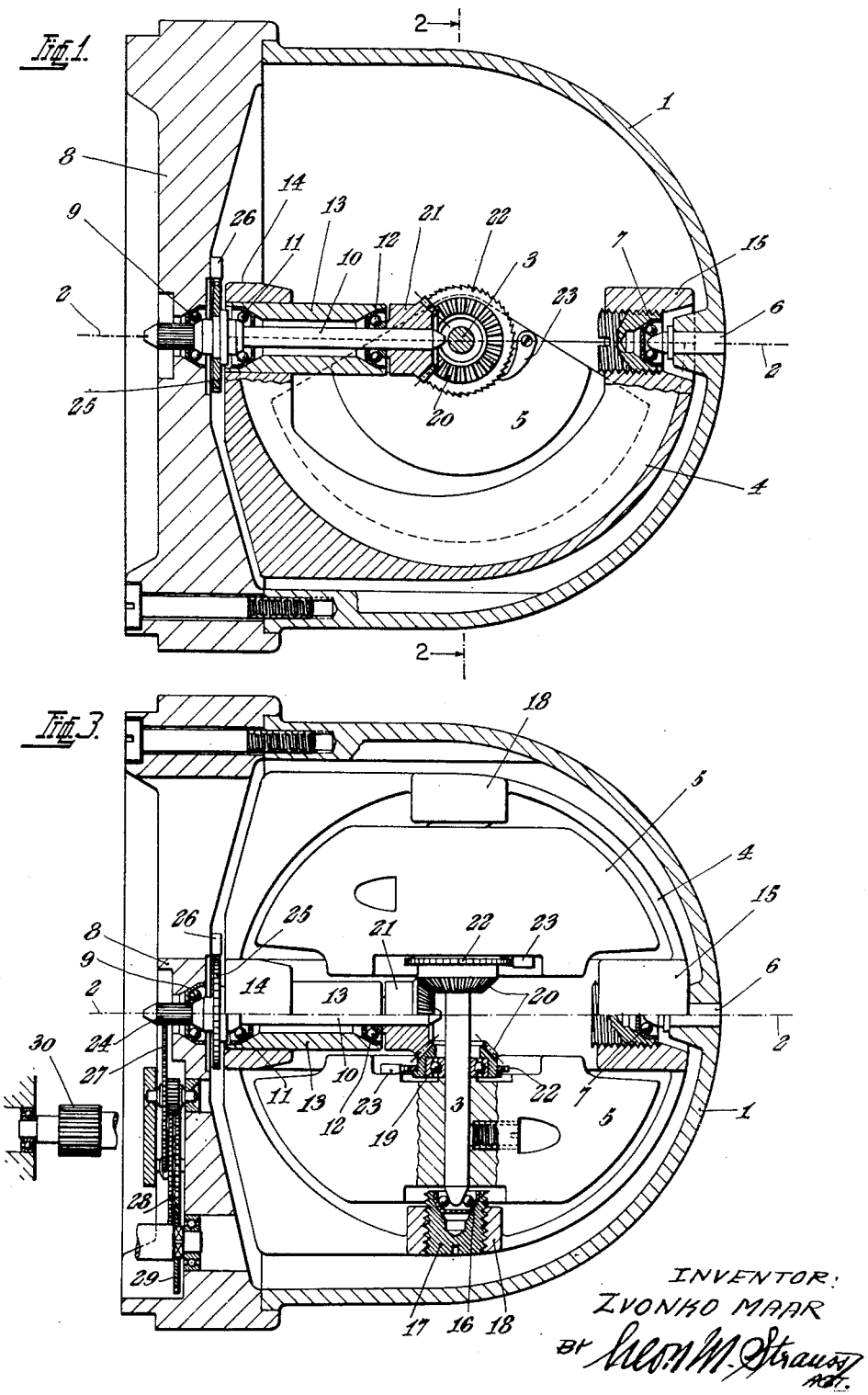

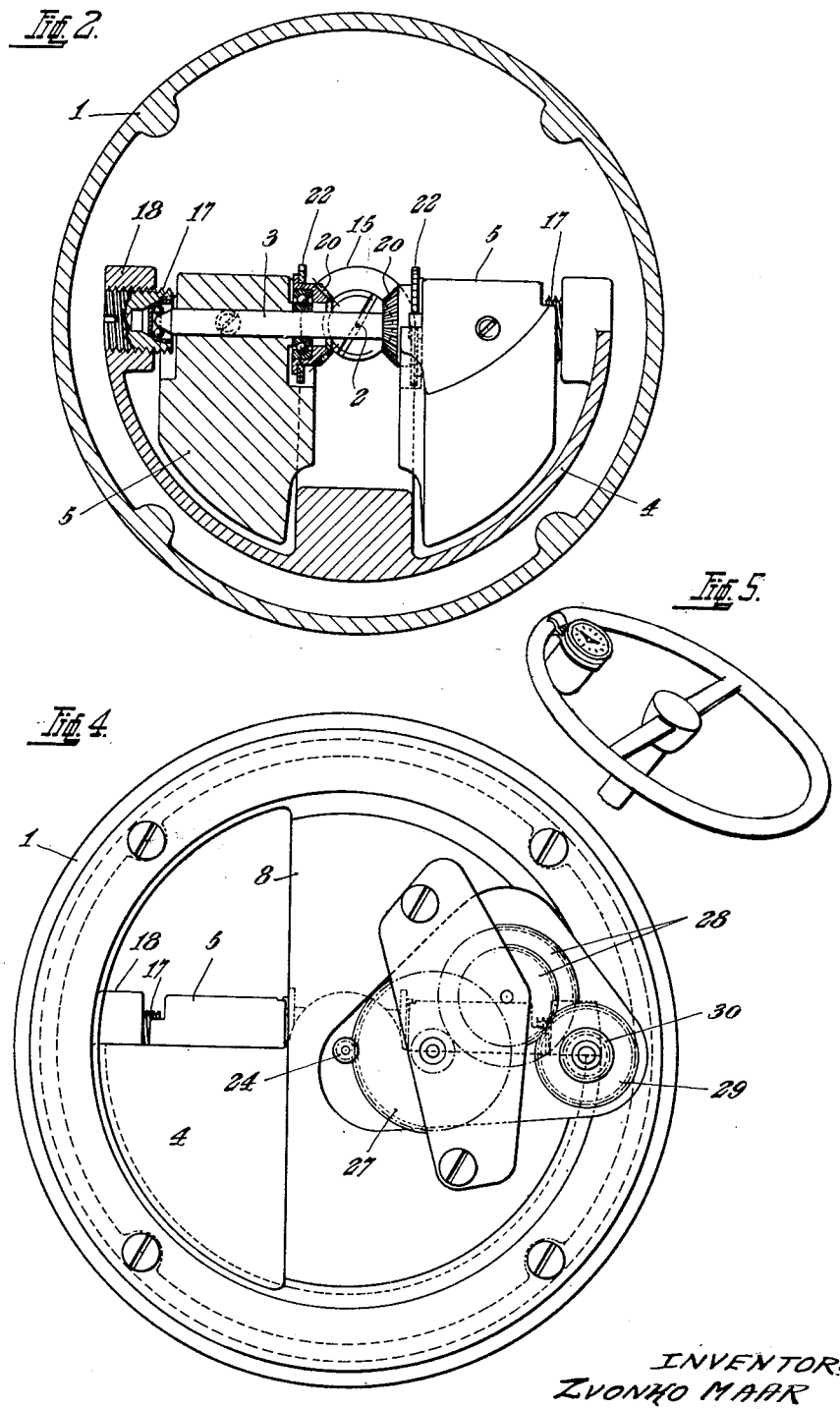

2,593,685

UNITED STATES PATENT OFFICE 2,593,685

TIMEPIECE WINDING DEVICE

Zvonko Maar, Rome, Italy

Application April 5, 1948, Serial No. 19,038
In Switzerland March 15, 1948

11 Claims. (Cl. 58—46)

This invention relates to self-winding clocks or like timepieces, and has for one of its objects a device for winding up clocks and other apparatus which are connected to the steering wheel of vehicles, said device taking up vibrations emanating from the movements of the front axle and, in addition, movements emanating from rotations of the steering wheel caused by the driver while directing the car so that the device may be rotated about 360° around its own axis when the vehicle describes curves, etc.

According to this invention a displaceable mass consisting of two oscillating pendulum masses moving one within the other is arranged in a casing which in turn is connected to the steering wheel, said pendulum masses being in operative connection with the motion or mainspring of the clock mechanism to be wound up.

The swinging axes of the masses are preferably disposed in a single plane and cross each other in Cardanic fashion to thereby rotate the common driving output spindle by means of gear and ratchet wheels.

By way of example one embodiment of the invention is shown in the drawings, in which:

Fig. 1 is a section taken along the longitudinal axis of the device embodying the invention.

Fig. 2 shows a partial section along the line 2—2 of Fig. 1.

Fig. 3 shows a plan view, partly in section, of Fig. 1.

Fig. 4 is an end elevation of the device turned through an angle of 90° with respect to Fig. 3, and Fig. 5 shows the attachment of the device to the steering wheel.

The device has two pendulum masses 4 and 5 of substantially spherical shape disposed one within the other which are respectively pivotally arranged on the spindles 10 and 3 in casing 1.

On one side the mass 4 is mounted by means of a ball bearing 7 on the pin or stub 6 which is securely fixed in the casing 1 and on the other side by means of the spindle or drive shaft 10 mounted in the ball bearing 9 which is rigidly secured to the anchor plate 8, said spindle 10 being held in the sleeve 13 by means of the ball bearings 11 and 12. The sleeve 13 fits tightly into the hub 14 of mass 4 and the ball bearing 7 is securely mounted in the hub-part 15 arranged opposite to hub 14.

Spindle 3 on which the masses 5 are mounted for pivotal movement is arranged at right angles to spindle 10. Spindle 3 is mounted in two ball bearings 16 arranged opposite to each other, said ball bearings being mounted in the screw plugs 17. The screw plugs 17 are held adjustably in the lugs 18 of mass 4. Between the masses 5 two operable members in the form of bevel gears 20 mounted on ball bearings 19 are arranged on the spindle 3 which bevel gears mesh with a third bevel wheel 21 lying between them and securely connected to spindle 10. On the hubs of the bevel gears 20 rims of unidirectional drive means such as ratchet wheels 22 are arranged and securely fixed to them. With each of said rims a pawl 23 engages, the latter being fixed to the masses 5. When the masses 5 swing in unison to and fro or around the axis thereof the pawls are rotated when the masses swing to the right and to the left thus rotating the bevel gears connected to the ratchet wheels and in turn the bevel wheel 21 lying between the two bevel gears 20, said bevel wheel transmitting its rotation to spindle 10 which carries a small pinion 24 at its free end.

Also the outer masses 4 carry out oscillations about spindle 2. These movements are utilized through the bevel gears 20 which form a differential gear whereby a ratchet wheel 25 fixed to the spindle 2 and pivoted pawl 26 carried by the stretcher 8 prevents a backward rotation of spindle 2.

The pinion 24 drives the small gear wheel 30 through an intermediate gearing 27, 28, 29 said gear wheel engaging a train of toothed wheels (not shown) in the spring housing for transmitting motion to the spring of the apparatus to thereby wind the spring.

The individual pivotally mounted parts of the moving masses are arranged in such a manner that they swing about 360° around their respective axes in different planes.

As shown in Fig. 5 the device can be clamped or in any desirable way fixed in position on the steering wheel and preferably a predetermined distance radially from the center section thereof.

What I claim is:

1. A winding-up mechanism for a timepiece adapted to be arranged on the steering wheel of a vehicle to take up vibrations from said vehicle and to be moved to and fro by the driver through actuation of said steering wheel; comprising a casing including means for mounting said casing on said steering wheel, two oscillatory pendulum masses provided with means for oscillatably supporting one within the other and within said casing, a common output spindle for winding said timepiece, each of said pendulum masses being provided with a corresponding axle and with means coacting with said axles, respectively, to rotate said common output spindle in response to oscillations of said masses.

2. A mechanism according to claim 1, wherein said axles are arranged at an angle of 90 degrees to each other and in a single plane.

3. A mechanism according to claim 1, wherein the inner of said oscillatory pendulum masses includes two parts of substantially like construction, said parts being spaced from each other and arranged on an axle common to both said parts.

4. A mechanism according to claim 1, wherein the outer of said oscillatory masses is of substantially semi-spherical shape.

5. A mechanism according to claim 1, wherein said casing is of substantially semi-spherical shape and is provided with means for supporting said oscillatory masses.

6. A mechanism according to claim 1, wherein said coacting means comprises gears and ratchet wheels on one of said axles to ensure rotation of said output spindle in one direction.

7. In a winding-up mechanism for a timepiece adapted to be mounted on the steering wheel of a vehicle, comprising a main axle for winding said timepiece, an exterior pendulum mass swingable about an axis and provided with an inner hollow space, a second pendulum mass disposed within said hollow space and swingable about an axis, the axis of said second mass being disposed in the same plane of and at an angle of 90 degrees to said axis of said exterior pendulum mass, both said pendulum masses being adapted to rotate together about the axis of said main axle, and differential gear means operatively connected with both said exterior pendulum mass and said second pendulum mass for actuating said main axle of said timepiece.

8. The combination, in an automotive vehicle, of a steering wheel, with a clock having a motion spring, said clock including a winding-up mechanism, said winding-up mechanism comprising a gear and ratchet wheels, and pendulum means adapted to swing about 360° around an axis, whereby vibrations as well as rotative movements of the steering wheel to the extent of 360° may be imparted to said pendulum means and thence through said gear and ratchet wheels to said motion spring of said clock, said pendulum means including at least two swingable masses of which one encompasses the other of said masses, said pendulum masses being positioned to swing in different planes.

9. A winding-up mechanism having a drive shaft and adapted to be applied to a timepiece, comprising at least one pendulum means arranged for swinging movement in opposite directions about an axis of oscillation, and differential gear means including at least three operable members in driving connection with each other, two of said operable members including unidirectional drive means, said unidirectional drive means translating the swinging movements of said pendulum means in opposite directions to said drive shaft through said third operable member whereby rotative movements in one direction only are imparted to the latter shaft to wind up said timepiece.

10. A winding-up mechanism according to claim 9, wherein said one pendulum means is arranged and shaped to swing about said axis of oscillation to the extent of 360°.

11. A winding-up mechanism having a drive shaft, comprising at least one pendulum means arranged for swinging movement to the extent of at least 180° and in opposite directions about an axis of oscillation, and differential gear means operatively connected to said pendulum means, said differential gear means including at least three bevel gears in driving connection with each other, two of said bevel gears being provided with unidirectional drive means, said drive means including ratchet wheels and pawls for transmitting the swinging movements of said pendulum means in opposite directions to said drive shaft by virtue of the third bevel gear whereby rotative movements in one direction only are imparted to the latter shaft.

ZVONKO MAAR.

REFERENCES CITED

The following references are of record in the file of this patent:

UNITED STATES PATENTS

| Number | Name | Date |
|---|---|---|
| 2,234,527 | Hollingsworth | Mar. 11, 1941 |
| 2,399,131 | Matter | Apr. 23, 1946 |

FOREIGN PATENTS

| Number | Country | Date |
|---|---|---|
| 3,302 | Great Britain | of 1877 |
| 163,058 | Switzerland | Oct. 2, 1933 |
| 169,397 | Switzerland | Aug. 1, 1934 |